United States Patent
Maderna

[11] 3,805,508
[45] Apr. 23, 1974

[54] REINFORCING CORD FOR ELASTOMERIC ARTICLES
[75] Inventor: Michele Luigi Maderna, Monza, Italy
[73] Assignee: Industrie Pirelli S.p.A., Milan, Italy
[22] Filed: Apr. 18, 1972
[21] Appl. No.: 245,175

[30] Foreign Application Priority Data
May 18, 1971  Italy .................................. 24646/71

[52] U.S. Cl. ................................................ 57/145
[51] Int. Cl. .............................................. D07b 1/06
[58] Field of Search ............ 57/3, 6, 14, 9, 53, 139, 57/144, 145, 156, 160, 161, 149, 166, 147, 148

[56] References Cited
UNITED STATES PATENTS
2,492,352   12/1949   Bourdon .............................. 57/148
2,598,033   5/1952    Bourdon .............................. 57/144
3,243,338   3/1966    Jackson ............................ 57/144 X
2,105,338   1/1938    Sunderland ............................ 57/9
3,336,744   8/1967    Peene ................................... 57/145

Primary Examiner—Donald E. Watkins
Attorney, Agent, or Firm—Stevens, Davis, Miller & Mosher

[57] ABSTRACT

A cord for reinforcing elastomeric articles such as rubber pneumatic tires for vehicles or the like comprises a twisted core strand of at least two elementary wires and at least one wire wound about the twisted strand at a winding pitch of from about 38 percent to about 47 percent of the stranding pitch.

6 Claims, 1 Drawing Figure

PATENTED APR 23 1974 3,805,508
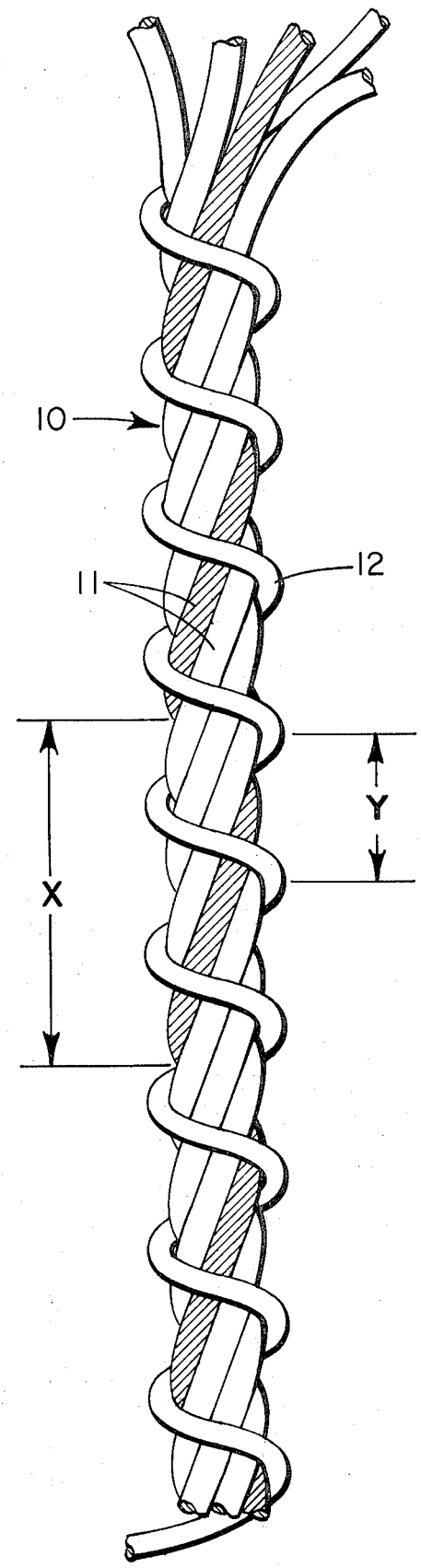

REINFORCING CORD FOR ELASTOMERIC ARTICLES

This invention relates generally to metallic strands or cords adapted to be used for reinforcing or strengthening elastomeric articles and more particularly to steel cords adapted to be used in pneumatic tires having a radial carcass. The invention is especially concerned with steel cords for vehicle tires which have a core strand of twisted wires wrapped with a helically wound wire.

Pneumatic tires for vehicles and particularly those for industrial vehicles and off-the-road vehicles may be provided with metallic cords in both the rubberized fabric used as a belting or breaker and in the rubberized fabric used in fabricating the carcass. Such metallic cords may be manufactured in either of two types depending upon the particular application for which they are intended. One type of cord may have one strand composed of a single group of two or more elementary steel wires joined by twisting them together. Such cords are referred to herein as "primary" cords. A second type of cord is known as a "secondary" cord and has two or more strands of twisted wires joined by twisting them together.

It is known that the reinforcing materials used in pneumatic tires must be very resistant to fatigue caused by repeated flexing or compression. It is particularly important that reinforcing members used as the tire's belting be resistant to fatigue caused by compression of the tire.

Elementary wires of high quality steel which have a very small diameter of say 0.10 to 0.30 millimeters are joined to form strands for use in cords where resistance to fatigue from flexing is required. For example, the so-called 4 × Dia cord, the 7 × 3 × Dia cord and the 7 × 4 × Dia cord are reinforcing cords which have a high resistance to fatigue under repeated flexing or bending. The 4 × Dia cord has only one strand of four elementary wires. The 7 × 3 × Dia cord has seven strands each formed from three elementary wires while the 7 × 4 × Dia strand also has seven strands but each strand is formed by twisting together four elementary wires.

The twisted or wound wires of a strand tend to separate after the strand has been subjected to a series of axial compressions. The separated wires then become permanently deformed and break under the stress of compression. This phenomenon may occur because of defects in the steel or because the stresses are not always applied in a line along the geometrical axis of the cord. It has been proposed heretofore to reduce this tendency of the wires of a tire cord to separate and become deformed by helically winding a wire or tape about the strands of elementary wires. It has been found that a wound wire strand is more resistant to fatigue stresses caused by axial compression. It has always been thought that the resistance of a given cord is greater the lower the absolute value of the winding pitch of the covering wire. It has been the practice to provide a series of strands of substantially the same composition and physical characteristics but having covering wires wound thereabout at various winding pitches to provide cords of various fatigue resistances. Unfortunately, the cost of cords having a covering wire wound thereabout at a small winding pitch is great because the output of the winding machine is necessarily small.

An object of this invention is to provide a primary steel cord for reinforcing elastomeric articles which has an improved resistance to fatigue when subjected to repeated flexing or to axial compression. A further object of the invention is to provide for vehicle pneumatic tires and the like an improved steel cord having at least two elementary wires twisted together and at least one wire helically wound thereabout which is resistant to fatigue when subjected to flexing or axial compression thereof and which can be produced more economically than the heretofore available more fatigue resistant cords.

The objects of the invention are accomplished, generally speaking, by providing a metallic cord adapted to be used to reinforce a vehicle tire or the like which comprises only one strand of at least two twisted elementary wires and at least one wire or tape helically wound about the strand at a winding pitch which is from about 38 percent to about 47 percent of the stranding pitch of the twisted elementary wires. The preferred stranding pitch is from about 9.5 to about 14 mm. The applicants have discovered that the winding pitch of the covering wire must be within the stated range to provide optimum resistance of the cord to fatigue when it is flexed or axially compressed. This optimum range is beyond the maximum values used heretofore. The improved resistance of the cord having a wire wound about at least two elementary wires provided by this invention is believed to be due to the combined effect of the elementary wires and the wire or tape helically wound thereabout.

Referring now to the drawing four elementary wires 11 are twisted spirally together to form a strand 10. A wrapper wire 12 is helically wound about strand 10 at a winding pitch Y of from about 38 percent to about 47 percent of the stranding pitch X.

The improved fatigue resistance of the composite cord provided by this invention is illustrated by the results in Table I hereinafter. The results set forth in this table were obtained by subjecting a plurality of cords of the 4 × Dia primary type having elementary wires of 0.22 mm and covered with a helically wound wire of 0.15 mm to fatigue resistance tests under axial compression and under flection. The cords which were tested had been prepared from the same kinds of wires and differed from each other only because the winding pitch of the covering wire was varied from one cord to the other.

It is to be noted that the winding pitch of the covering wire specified hereinbefore is not an absolute value (pa) but is, on the other hand, the percentage ratio of winding pitch of the covering wire related to the stranding pitch (pc) of the elementary wires which form the core of the cord. Such a ratio is indicated as pa/pc × 100.

The results reported in Table I are the values pa/pc × 100 values obtained in fatigue resistance tests under axial compression $F_c$ and under flection $F_f$. The "total" resistance to fatigue is expressed in percentage determined as $(F_c + F_f)/2$. The cord provided by this invention is compared with a conventional steel cord widely used heretofore in pneumatic tires having a radial carcass. $F_c$, $F_f$ and $(F_c + F_f)/2$ values, conventionally assumed to be equal to 100, have been given to the reference or comparison cord in order to facilitate its comparison with the cords provided by this invention and to demonstrate the advantages of the cord provided by the invention.

In determining the resistance of the cords to fatigue when flexed, a strip of rubberized fabric containing 9 metal cords all arranged parallel to its longitudinal axis was provided in a length of about 200 mm. and a width of about 10 mm. The strip was flexed by causing it to run over a pulley having a diameter of 32mm. alternately. The frequency of the flexing was 31.6 kilocycles per hour and the amplitude (i.e. the distance between the two extreme positions of the strip during its movement) was 120 mm. Simultaneously, the strip was subjected to tension under a load of about 68 kg (150 lbs.). The test was continued until the specimen broke and the number of cycles was taken as the index of its resistance to fatigue.

In determining the fatigue resistance of the cord when compressed, samples about 130 mm. long and 50 mm. wide were used. Each sample was composed of two layers of rubberized fabric having a density of 11.85 cords per centimeter and inclined with respect to each other at about 40° or about 20° with respect to the longitudinal axis of the sample. The sample was clamped along its smaller sides to provide a free central zone about 50 mm. square. One clamp was fixed while the other was adapted to be moved up and down at a frequency of 18 kilocycles per hour with a total amplitude of 6 mm. (i.e., 3 mm. up and 3 mm. down from its rest position) in a direction parallel to the shorter axis of the sample. Simultaneously, a tension force of 60 kg. directed parallel to the longitudinal axis of the specimen was applied to the sample. In this way the cords were alternately subjected to tension and to axial compression. The test was discontinued when one of the cords broke. The number of cycles was the index of the fatigue resistance.

TABLE I
4×dia. type cord—diameter of elementary wire=0.22 mm.

|  | $p_a$ (mm.) | $p_c$ (mm.) | $\frac{p_a}{p_c} \cdot 100$ | $F_c$ | $F_f$ | $\frac{F_c+F_f}{2}$ |
|---|---|---|---|---|---|---|
| Standard cord | 4.57 | 13.36 | 34 | 100 | 100 | 100 |
| Cord I | 5.06 | 13.36 | 38 | 73 | 239 | 156 |
| Cord II | 5.79 | 13.36 | 43.5 | 372 | 258 | 315 |
| Cord III | 4.13 | 10.75 | 38.5 | 81 | 213 | 197 |
| Cord IV | 4.57 | 10.75 | 42.5 | 262 | 166 | 214 |
| Cord V | 4.57 | 9.7 | 47 | 157 | 207 | 182 |
| Cord VI | 5.79 | 9.7 | 60 | 65 | 139 | 102 |

It can be noted from the results in the above table that significant improvement in total fatigue resistance is obtained with primary cords in which the winding pitch of the covering wire is between 38% and 47% of the stranding pitch of the elementary wires constituting the single strand or core wire. This is particularly noticeable in the fatigue resistance under axial compression. The improvement is most significant with cords in which the winding pitch of the covering wire is between about 40% and 45% of the stranding pitch. When the winding pitch is 40% to 45% of the stranding pitch, the total fatigue resistance is over 3 times greater than that of the conventional heretofore available cord in which the winding of the cover wire is not within the range specified for the cord of this invention. In other words, the results show that cords in which the winding pitch of the cover wire is below 38 percent or above 47 percent are inferior in fatigue resistance to the cords provided by the invention.

Of particular importance is the fact that the cords provided by the invention can be made at less cost than the prior art cords because of greater output of the machines which can work at the same stranding pitches but longer cover wire winding pitches. As shown in Table I, when the winding pitch of the covering wire is increased from 34% ($p_a \times 100$) to 38%, the total fatigue resistance ($F_c + F_f$) is increased from 100 to 156. Increasing the winding pitch to 43.5%, increases the total fatigue resistance to 315. Hence, the product of the invention has better fatigue resistance and can be produced in greater amounts per unit of time.

The wires used to fabricate the strand or core and for the covering wire may be any of the suitable conventional steel wires used heretofore for tire cords. The steel cords provided by the invention may be embedded for strengthening purposes in any elastomer such as, for example, natural or synthetic rubber or the like.

Although the invention has been described in detail for the purpose of illustration, it is to be understood that such detail is solely for that purpose and that changes can be made by those skilled in the art without departing from the spirit and scope of the invention except as it may be limited by the claims.

The embodiments of the invention in which an exclusive property or privilege is claimed are defined as follows:

1. A steel cord adapted for reinforcing elastomeric articles which comprises a core strand having at least two twisted elementary wires and at least one wire helically wound about the elementary wires at a winding pitch of from about 38% to about 47% of the stranding pitch of the elementary wires.

2. The cord of claim 1 wherein the said winding pitch is from about 40 percent to about 47 percent of the stranding pitch.

3. The cord of claim 1 wherein the said winding pitch is from about 38 percent to about 45 percent of the said stranding pitch.

4. The cord of claim 1 wherein the said stranding pitch is from about 9.5 to about 14 mm.

5. The cord of claim 1 wherein the said stranding pitch is from about 9.5 to about 14 mm. and the pitch of the cover wire is from about 40 percent to about 47 percent of the stranding pitch.

6. A steel cord adapted for reinforcing an elastomeric article, said cord comprising a plurality of wires helically twisted together into a strand and a covering wire helically wound about the strand at a pitch of from about 38 percent to about 47 percent of the stranding pitch of the said twisted wires, whereby the tendency of the said twisted wires to separate and become deformed is reduced and the fatigue resistance of the twisted wires when flexed is improved.

* * * * *